United States Patent [19]

McSweeney

[11] Patent Number: 5,077,623
[45] Date of Patent: Dec. 31, 1991

[54] METHOD AND APPARATUS FOR AUTOMATICALLY OPTIMIZING THE RECORD CURRENT IN A TAPE RECORDER USING A REFERENCE TAPE

[75] Inventor: William McSweeney, Saratoga, Calif.

[73] Assignee: Ampex Corporation, Redwood City, Calif.

[21] Appl. No.: 504,377

[22] Filed: Mar. 30, 1990

[51] Int. Cl.⁵ ............................................. G11B 27/36
[52] U.S. Cl. ......................................... 360/31; 360/65
[58] Field of Search ....................... 360/31, 65, 67, 68, 360/46

[56] References Cited

U.S. PATENT DOCUMENTS 4,872,071 10/1989 Easton et al. ........................ 361/31

Primary Examiner—Vincent P. Canney
Attorney, Agent, or Firm—George B. Almeida

[57] ABSTRACT

A record current optimization technique includes a magnetic reference tape pre-recorded with a selected frequency at a precisely known level into the tape. A magnetic tape recorder is loaded with the reference tape, and a reference playback level is recovered from the reference tape with a playback head, and is stored or otherwise noted. A recording at the selected frequency then is made with a record head on an unrecorded portion of the reference tape. The new recording is simultaneously read out with the playback head and record current automatically or manually is adjusted until the new playback level matches the reference playback level. A value corresponding to this optimized record current is stored. The record head thus is optimized for any subsequent recording process, by selecting the stored value corresponding to this value. The optimization technique may be employed to optimize record currents in audio, video and data, analog or digital, recorders.

23 Claims, 1 Drawing Sheet

& nbsp;
METHOD AND APPARATUS FOR AUTOMATICALLY OPTIMIZING THE RECORD CURRENT IN A TAPE RECORDER USING A REFERENCE TAPE The present invention relates to the setting of record current levels in a magnetic tape recorder and, more particularly, to the automatic optimization of record current levels when recording with an audio, video or data tape recorder, whether digital or analog, using a pre-recorded reference tape as a standard.

BACKGROUND OF THE INVENTION

The level of magnetically recorded audio, video or data signals is known to differ if record current levels vary during recording processes on tapes using different recorders, or when recording on different tapes. More particularly, even with the same record current, the recording levels may vary due to the different properties or characteristics which exist between, for example, different heads, tapes and environments. To exemplify, differences in the magnetic properties of tape materials can cause variations in the levels of magnetically recorded signals in different tapes even though the record current is constant. Variations in the recorded signal levels, in turn, cause problems such as poor edit overwrite and poor interchangeability of tapes between recorders. Thus, it has always been highly desirable to optimize the record current when recording audio, video or data signals on tape, to provide consistent recording levels in all tapes using any recorder/reproducer apparatus.

Typical of present techniques for setting the record current for a record head when recording a tape in a magnetic tape recorder, particularly those with ferrite heads, is to use trial and error while in the record process until the saturation level of the tape is found. In some prior techniques, a previously stored fixed "reference" value is used to set the record current for the record head, generally by manually adjusting the record current until the required rf playback amplitude is achieved. Such techniques fail to eliminate the very substantial playback head changes in efficiency which occur during the life of the head, and fail to account for tape-to-tape output level variations. Such techniques have been utilized not only in present digital video tape recorders, but also, in setting the record currents in type-C analog video tape recorders.

However a problem arises when using the Nyquist frequency and saturating the tape. That is, even if the Nyquist frequency is recorded on tape, and the record current is adjusted until the tape saturates, it is impossible to ascertain how deeply the lower frequency levels, such as ⅓ Nyquist, are recorded on the tape. However, it is these frequencies in the lower half of the video signal frequency spectrum, which generally cause recording at prohibitively varied and high levels. This condition also exists in an audio system where the different frequencies of the audio signal frequency spectrum require varied recording levels. In turn, where a recording is made at high levels and an insert edit with no prior erasure subsequently is performed over the recording, the high level lower frequencies of the old recording are not erased by the new edit recording. This results in a very poor overwrite condition and an unacceptable insert edit.

Thus, it is highly desirable that recording of audio, video or data signals be done uniformly at all times and without incurring prohibitively high or varied levels of recording on tape, which would lead to the poor overwrite conditions during editing procedures. In addition, it is highly desirable to maintain the interchangeability of tapes between recorders. However, if the recording level varies, as when using non-uniform record currents or different magnetic tapes, or when the recording characteristics change as the head wears down, then the same record current may provide more or less output, causing a variation in the recording level. This, in turn, also negatively affects the interchangeability of tapes between recorders.

SUMMARY OF THE INVENTION

The record current optimization technique described herein overcomes the problems of the prior art, by insuring that record current levels are standardized for the lower frequencies of the spectrum, and that the levels of signals recorded on different tapes of possibly different magnetic properties are consistent and easily reset as the heads wear down and their efficiency changes. Thus recorded current levels are consistent between recordings and can be consistently overwritten in an editing process. In addition, the interchangeability of tapes between recorders is assured.

To this end, in a digital video system, the invention insures that a ⅓ Nyquist or similar lower frequency component is recorded on a tape in a video tape recorder, to allow equally consistent overwrite performance. More particularly, the invention technique contemplates the precise pre-recording of a reference tape which is supplied to a customer for use as a calibration tape in the magnetic tape recorder. The reference tape contains a recording of ⅓ Nyquist frequency, or other selected suitable frequency, made by a precisely adjusted video tape recorder, wherein the selected frequency is recorded at the precise proper depth to provide thus an absolute, precisely known, recorded level in the reference tape. The tape also includes time code recorded thereon, and a length of blank tape is left available on the tape following the pre-recorded portion of selected frequency.

The invention may initiate an auto record current optimize mode similar to existing selected analog and digital video tape recorders, or may employ a manual procedure in a tape recorder that does not have the automatic mode available. At such time as the recorder is to be set up, the reference tape is loaded and, upon request, the recorder searches for time code and plays back the selected ⅓ Nyquist frequency pre-recording with each respective playback head. While playing back, a measurement of the rf amplitude, or level, read by each playback head associated with respective record heads, temporarily is stored in memory via a computer. The video tape recorder then automatically is shuttled to the blank portion of the reference tape, and a recording is made at ⅓ Nyquist, or the selected suitable frequency, with each respective record head. The level of each record current is adjusted either manually or by the microprocessor until a concurrent playback rf amplitude matches the reference rf amplitude level which previously was measured via each playback head and which was stored in the memory. The value representative of the corresponding record current for each head then is stored in memory. In subsequent use of the magnetic tape recorder as, for example, when recording, editing, etc., the computer selects the record currents for each record head from the values in storage, thereby providing the proper record currents required to provide consistent recording levels in any subsequently recorded tape.

It may be seen that the tape that is used to derive the second playback level and to adjust the record current, is the same tape as the tape in which the precise reference pre-recording is made. Therefore, any fluctuations that occur due to playback head sensitivity, or tape-to-tape sensitivity, that is, any playback fluctuations, are eliminated.

Although the invention concepts generally are discussed herein relative to video signals and digital video tape recorders, it is to be understood that the concepts apply equally well to audio and data signals and to their respective recorders, analog or digital. Also, any number of heads and corresponding record current levels can be optimized.

DETAILED DESCRIPTION OF THE INVENTION

Figure 1:
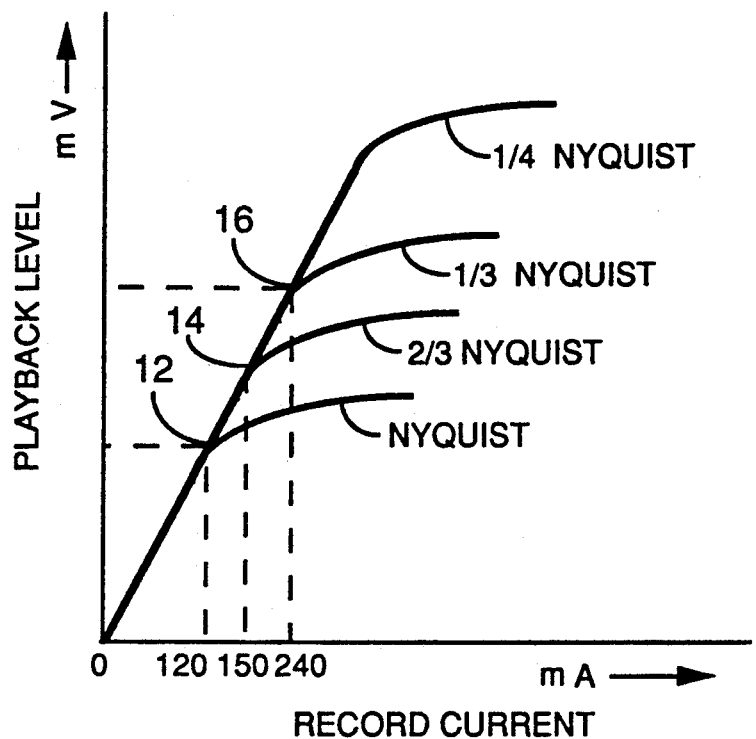
FIG. 1 is a graph depicting the playback level versus the record current level for a selected range of frequencies, including ⅓ Nyquist, and showing the saturation levels at different frequencies.

Referring to FIG. 1, a graph depicts the relationship of record current level versus playback voltage level for different frequencies such as those in the lower half of the video spectrum, including ⅓ Nyquist frequency, up through the Nyquist frequency. As previously mentioned, when using Nyquist frequency to set the record current, as the record current is turned up, the playback voltage level readout increases and the tape may saturate for example, at the point 12, depending upon the head and tape properties and characteristics. However, there is no way of knowing where ⅓ Nyquist is; that is, how deeply ⅓ Nyquist is recorded on the tape. However, it is the lower frequencies which are the most critical in that they cause the varied or high levels of recording on tape which lead to poor edits and poor tape interchangeability. Thus, it would be desirable to known that if ⅓ Nyquist is recorded with, for example, a record current of the order of 150 m Amps, as at point 14 in FIG. 1, then Nyquist would be recorded at its optimum level and ⅓ Nyquist at its preselected reference level.

Figure 2:
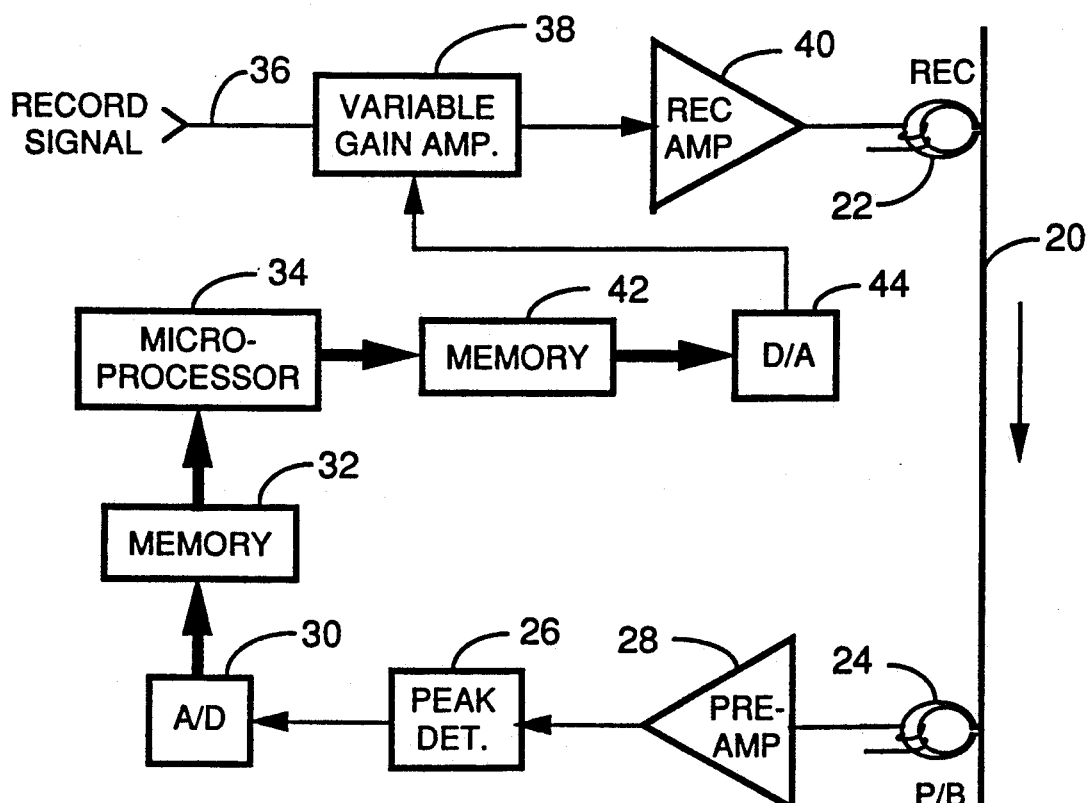
FIG. 2 is a block diagram depicting one embodiment of tape recorder/reproducer apparatus for performing the method of the invention.

FIG. 2 depicts a system which may be used in performing the method of the invention. A reference tape 20 having a pre-recorded portion recorded at ⅓ Nyquist at a precise level into the tape, is loaded into a recorder tape transport (not shown) in conventional fashion. The transport includes herein, by way of example, a record head 22 and a playback head 24, although any number of heads may engage the tape and be optimized by this process. The pre-recorded portion of the tape 20 is located using time code, etc., on the tape, and is played back by the playback head 24, which supplies the resulting reference playback signal to a peak detector 26 via a preamplifier 28. The peak detector may be any of various linear signal detectors, for example, also may be an average value detector, or a root mean squared (RMS) detector, etc., that is capable of providing an indication of the playback voltage level. The reference playback level is converted to a digital reference playback level via an A/D converter 30, and the digitized playback level is stored temporarily in a memory 32 by a suitable associated microprocessor 34. Thus, the memory 32 in this example contains values corresponding to the reference playback rf level derived from a precise recording of, for example, ⅓ Nyquist frequency, or other selected suitable frequency in the lower half of the video spectrum. In an audio system the frequency used to pre-record the reference tape may be of the order of 1,000 Hz, and other suitable frequencies throughout the audio signal frequency spectrum with various ratios as required for spectrum shaping.

Next, the tape transport shuttles the reference tape in response to time code on the tape, to locate a following blank portion thereof. A record signal corresponding to ⅓ Nyquist, or the other selected suitable frequency, previously pre-recorded on the tape, is applied via input 36 to a variable gain amplifier 38. The selected frequency signal is applied to the record head 22 via a usual record amplifier 40, to be recorded on the blank portion of the reference tape 20. However, in accordance with the invention, when in the auto record current optimize mode, the playback head 24 simultaneously plays back the selected frequency being recorded on the tape by the record head 22. This second playback rf level is detected by the peak detector 26, is digitized and is supplied to the microprocessor 34. The microprocessor 34 compares the second playback rf level with the previously stored reference playback rf level provided from the reference tape. In response to the comparison the microprocessor adjusts the record current supplied to the record head 22 by varying the gain of the amplifier 38 via a memory store 42 and a D/A converter 44, until the second playback rf level matches the stored reference playback rf level. That is, any difference between the second playback rf level and the reference playback rf level, is reduced to zero by proper setting of the record current. The value corresponding to the optimized record current is stored in memory store 42 for use in subsequent recording and editing operations.

However, if a manual operation is to be performed, the output of the A/D converter 30 may be supplied to a monitor, voltmeter, etc., and the values noted. Upon playback of the recording on the blank portion of tape 20, the second playback rf level then is observed and the gain of the record amplifier 38 is adjusted manually until the second playback level matches the reference playback level previously noted. The value corresponding to the optimized record current thereafter is suitably stored and is selected on subsequent recording or editing processes thereby providing the proper level for consistent recording.

The record current optimizing technique of the invention first may be used, for example, upon manufacture and delivery of the tape recorder. Thereafter, it may be used periodically, to optimize the various record heads in the recorder as the heads wear down and their operating characteristics change, thereby changing their performance. In this way, the record currents for the heads are optimized so that they provide consistent levels of recordings.

What is claimed is:

1. A method for optimizing the record current in a magnetic tape recorder for recording data, comprising the steps of:

supplying a reference tape having a selected frequency recorded therein at an absolute record current level; and adjusting the record current until the level recorded thereby when performing a subsequent recording process on the reference example, is at substantially the same level as said absolute record current level.

2. The method of claim 1 wherein the step of supplying includes:

pre-recording the reference tape at precisely said absolute record current level with a frequency selected from the lower half of the frequency spectrum of said data.

3. The method of claim 2 including the steps of:

determining a reference playback level from the pre-recorded absolute record current level;

reproducing a second playback level from said subsequent recording process; and modifying said record current until said second playback level matches said reference playback level.

4. The method of claim 3 wherein the step of determining includes:

measuring the reference playback level of the selected frequency pre-recorded on the reference tape; and storing the reference playback level.

5. The method of claim 3 wherein:

said record current is a data record current; and said selected frequency is ⅓ Nyquist.

6. The method of claim 3 wherein:

said recorder is a digital video tape recorder employing a data record current; and said selected frequency is in the lower half of the data frequency spectrum.

7. The method of claim 3 wherein:

said recorder is an audio tape recorder employing an audio record current; and said selected frequency is in the lower half of an audio signal frequency spectrum.

8. The method of claim 2 wherein the step of adjusting includes:

recording the selected frequency on a blank portion of the reference tape during said subsequent recording process;

modifying said record current until the second playback level matches the reference playback level; and storing a value corresponding to the optimized record current.

9. A method for optimizing the record current in a tape recorder having a record head and a playback head, comprising the steps of:

pre-recording a selected frequency at an absolute level in a reference tape;

measuring a reference playback level of the pre-recorded reference tape via said playback head;

generating a second recording of said selected frequency on the reference tape via the record head;

matching a second playback level, derived via said playback head from said second recording, with said reference playback level.

10. The method of claim 9 including the step of:

temporarily storing the measured reference playback level.

11. The method of claim 10 wherein the step of matching includes:

reproducing a second playback level from said second recording; and adjusting said record current until said second playback level matches said stored reference playback level.

12. The method of claim 9 wherein the reference tape has time code thereon, including:

loading the reference tape into the video tape recorder; and locating time code and thus the pre-recorded selected frequency to reproduce the reference playback level.

13. The method of claim 9 wherein:

the step of pre-recording includes leaving a portion of the reference tape unrecorded; and the step of generating a second recording includes generating the recording at the selected frequency on said unrecorded portion of the reference tape.

14. The method of claim 9 wherein the selected frequency of the reference tape is ⅓ Nyquist.

15. The method of claim 9 wherein the selected frequency of the reference tape is in the lower half of the data signal frequency spectrum.

16. A method for optimizing the record current in a video tape recorder, comprising the steps of:

pre-recording a frequency selected from the lower half of the video frequency spectrum at an absolute level in a reference tape;

determining a reference playback rf level of the pre-recorded selected frequency;

recording the selected frequency on a blank portion of the reference tape;

reproducing a second playback rf level from the recording on the blank portion; and adjusting said record current to substantially match said second playback rf level with the reference playback rf level.

17. The method of claim 16 wherein the step of determining includes:

measuring the reference playback rf level of the pre-recording;

comparing the second playback rf level with the measured reference playback rf level; and storing a value corresponding to the optimized record current.

18. The method of claim 17 including:

selecting the stored value to provide the optimized record current during subsequent recording processes.

19. A system for optimizing the record current in a tape recorder having a record head and a playback head, comprising:

a reference tape pre-recorded with a selected frequency at an absolute recorded level;

means for measuring a reference playback signal from the pre-recorded reference tape;

means for recording, in response to said record current, the selected frequency on an unrecorded portion of the reference tape;

wherein said means for measuring simultaneously plays back a second playback signal from the recording as it is being recorded; and means for adjusting said record current until the second playback signal substantially matches the reference playback signal.

20. The system of claim 19 wherein:

the adjusting means includes microprocessor means for comparing the second playback signal to the reference playback signal, and for adjusting said record current in response to the comparison.

21. The system of claim 20 including:

memory means responsive to said microprocessor means for storing a value representative of the optimized record current.

22. The system of claim 19 wherein:

the measuring means includes the playback head, and signal detector means coupled to the playback head; and the recording means includes the record head, and variable gain amplifying means coupled to the record head.

23. The system of claim 22 including:

an analog-to-digital converter disposed between said signal detector means and said adjusting means; and a digital-to-analog converter disposed between said adjusting means and said variable gain amplifying means.

* * * * *